US011865880B1

(12) United States Patent
Hartley

(10) Patent No.: US 11,865,880 B1
(45) Date of Patent: Jan. 9, 2024

(54) TRAILER ANTI-THEFT DEVICE

(71) Applicant: Danny R. Hartley, Kearns, UT (US)

(72) Inventor: Danny R. Hartley, Kearns, UT (US)

(*) Notice: Subject to any disclaimer, the term of this patent is extended or adjusted under 35 U.S.C. 154(b) by 0 days.

(21) Appl. No.: 18/207,583

(22) Filed: Jun. 8, 2023

(51) Int. Cl.
*B60D 1/28* (2006.01)
*B60D 1/46* (2006.01)

(52) U.S. Cl.
CPC .............. *B60D 1/28* (2013.01); *B60D 1/46* (2013.01)

(58) Field of Classification Search
CPC ............... B62S 1/28; B62S 1/46; B62S 1/52
See application file for complete search history.

(56) References Cited

U.S. PATENT DOCUMENTS

| | | | |
|---|---|---|---|
| 5,358,269 A | 10/1994 | Jakeman et al. | |
| 6,202,453 B1 * | 3/2001 | Disher | E05B 73/00 |
| | | | 280/507 |
| 6,244,614 B1 | 6/2001 | Bonvillain et al. | |
| 7,040,646 B2 | 5/2006 | Pare | |
| 7,413,212 B2 | 8/2008 | Hsai | |
| 7,571,922 B2 | 8/2009 | Pratchler | |
| 7,889,062 B1 * | 2/2011 | Albisa | B60D 1/62 |
| | | | 340/687 |
| 8,757,654 B2 | 6/2014 | Lachance | |
| 9,902,224 B2 | 2/2018 | Rathman | |
| 10,112,451 B2 | 10/2018 | Mikesell et al. | |
| 11,427,044 B2 | 8/2022 | Lee, II et al. | |
| 2004/0080141 A1 * | 4/2004 | Hart | B60D 1/00 |
| | | | 280/507 |
| 2006/0181060 A1 * | 8/2006 | Bussiere | B60D 1/60 |
| | | | 280/507 |
| 2008/0093823 A1 * | 4/2008 | Pratchler | B60D 1/363 |
| | | | 280/507 |
| 2009/0102159 A1 * | 4/2009 | Van Laere | B60D 1/60 |
| | | | 280/507 |
| 2014/0312594 A1 * | 10/2014 | St. Pierre | B60D 1/075 |
| | | | 280/482 |
| 2022/0055431 A1 * | 2/2022 | White | B60D 1/60 |

* cited by examiner

*Primary Examiner* — Tony H Winner
(74) *Attorney, Agent, or Firm* — Cramer Patent & Design PLLC; Aaron R. Cramer

(57) ABSTRACT

Embodiments of the present disclosure may include a trailer anti-theft device, including an interposer having a solid square metal bar having a coupler interface, a tongue interface, and an interposer stop, the interposer may be adapted to couple to a trailer. Embodiments may also include a tongue adapter adapted to couple to a tongue of the trailer. Embodiments may also include a hitch pin having a hitch pin shaft that passes through an interposer aperture and an adapter aperture, the hitch pin prevents the interposer from sliding out of the tongue adapter. In some embodiments, the interposer may be detachably coupled to the tongue adapter and may be retained by the hitch pin in preparation to adapt to hitching the trailer to a tow vehicle for towing.

5 Claims, 4 Drawing Sheets

TRAILER ANTI-THEFT DEVICE

RELATED APPLICATIONS

None.

FIELD OF THE INVENTION

The present invention relates to an anti-theft device and more specifically to an anti-theft device for a trailer.

BACKGROUND OF THE INVENTION

Trailer theft is a significant problem, with thieves targeting unattended trailers and stealing them for their valuable contents or for resale. The cost of stolen trailers and their contents can be substantial, not to mention the hassle and inconvenience of replacing the stolen items. To combat this issue, trailer owners have turned to anti-theft devices that can help prevent theft and protect their valuable assets. These devices range from simple locks and chains to sophisticated electronic tracking systems that can locate stolen trailers in real-time.

A popular anti-theft device is a trailer hitch lock, which is designed to prevent a thief from being able to connect the trailer to their vehicle. Hitch locks come in various forms, from simple padlocks that secure the hitch to more advanced models that use advanced locking mechanisms and require specific keys or combinations to unlock.

Another type of anti-theft device is a wheel lock, which attaches to the trailer's wheel and prevents it from moving. This type of lock is particularly effective when the trailer is parked for extended periods, as it makes it extremely difficult for a thief to tow the trailer away.

Other anti-theft devices include electronic tracking systems, which use GPS technology to locate stolen trailers in real-time. These systems can send alerts to the owner's phone or email if the trailer is moved or tampered with and can even disable the trailer's engine remotely. Overall, trailer owners have a wide range of anti-theft devices to choose from, each with its own strengths and weaknesses. However, as previously noted, most anti-theft devices currently available to a user are either expensive or cumbersome. Accordingly, there exists a need for a means by which a user may secure a given trailer against theft in a cost effective and simple manner. The use of the trailer anti-theft device accomplishes this task.

SUMMARY OF THE INVENTION

Embodiments of the present disclosure may include a trailer anti-theft device, including an interposer having a solid square metal bar having a coupler interface, a tongue interface, and an interposer stop, the interposer may be adapted to couple to a trailer. Embodiments may also include a tongue adapter adapted to couple to a tongue of the trailer.

Embodiments may also include a hitch pin having a hitch pin shaft that passes through an interposer aperture and an adapter aperture, the hitch pin prevents the interposer from sliding out of the tongue adapter. In some embodiments, the interposer may be detachably coupled to the tongue adapter and may be retained by the hitch pin in preparation to adapt to hitching the trailer to a tow vehicle for towing.

Embodiments may also include a coupler of the trailer may be coupled to the interposer. In some embodiments, the coupler and the interposer may be stored away from the trailer to deter theft of the trailer. In some embodiments, the interposer and the tongue adapter include a plurality of additional anti-theft features such that a substitute coupler will not fit in place of the coupler that was removed.

In some embodiments, the coupler interface may be attached to the coupler such that the coupler interface may be positioned on the coupler where the tongue would ordinarily be positioned extending rearward from the coupler. In some embodiments, the coupler may be welded to the coupler interface. In some embodiments, the coupler interface and the tongue interface may be located at opposing ends of the interposer with the interposer stop defining the boundary between the coupler interface and the tongue interface.

In some embodiments, the coupler interface defines the front of the interposer, and the tongue interface defines the rear of the interposer. In some embodiments, the tongue interface extends rearward to detachably couple to the tongue adapter and slides into the tongue adapter and may be held in place by the hitch pin passing through the interposer aperture disposed on the interposer and through an adapter aperture disposed on the tongue adapter.

In some embodiments, the interposer stop may be an enlargement of the interposer surrounding the interposer at a boundary between the coupler interface and the tongue interface to limit the insertion distance of the tongue interface. In some embodiments, the interposer includes a blocker slot and the tongue adapter includes a blocker plate that aligns with the blocker slot such that the interposer slides into the tongue adapter without interference.

In some embodiments, the tongue adapter includes an adapter stop which may be an enlargement of the tongue adapter surrounding the front end of the tongue adapter to assure that an insertion distance of the interposer may be limited. In some embodiments, the tongue adapter includes an upper collar and a lower collar. In some embodiments, the upper collar may be a boss located on the top of the tongue adapter, the lower collar, on the bottom of the tongue adapter.

In some embodiments, the upper collar aligns vertically with the lower collar if both may be present. In some embodiments, the upper collar includes a collar clip aperture and the retention clip may be inserted through the collar clip aperture in the upper collar and through the hitch pin clip aperture in the hitch pin shaft in order to secure the hitch pin.

In some embodiments, the interposer aperture may be an equal sized diameter as the adapter aperture and the diameter of the hitch pin shaft may be smaller than both the diameter of the interposer aperture and the diameter of the adapter aperture. In some embodiments, the hitch pin may be removed, and the interposer may be decoupled from the tongue adapter when the trailer may be stationary.

In some embodiments, the adapter aperture and the upper collar may be positioned such that the adapter aperture aligns with the interposer aperture when the interposer may be coupled to the tongue adapter. In some embodiments, the trailer anti-theft device, according to may include a hitch pin collar surrounding the top of the hitch pin shaft to prevent the hitch pin from passing entirely through the interposer and the tongue adapter.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
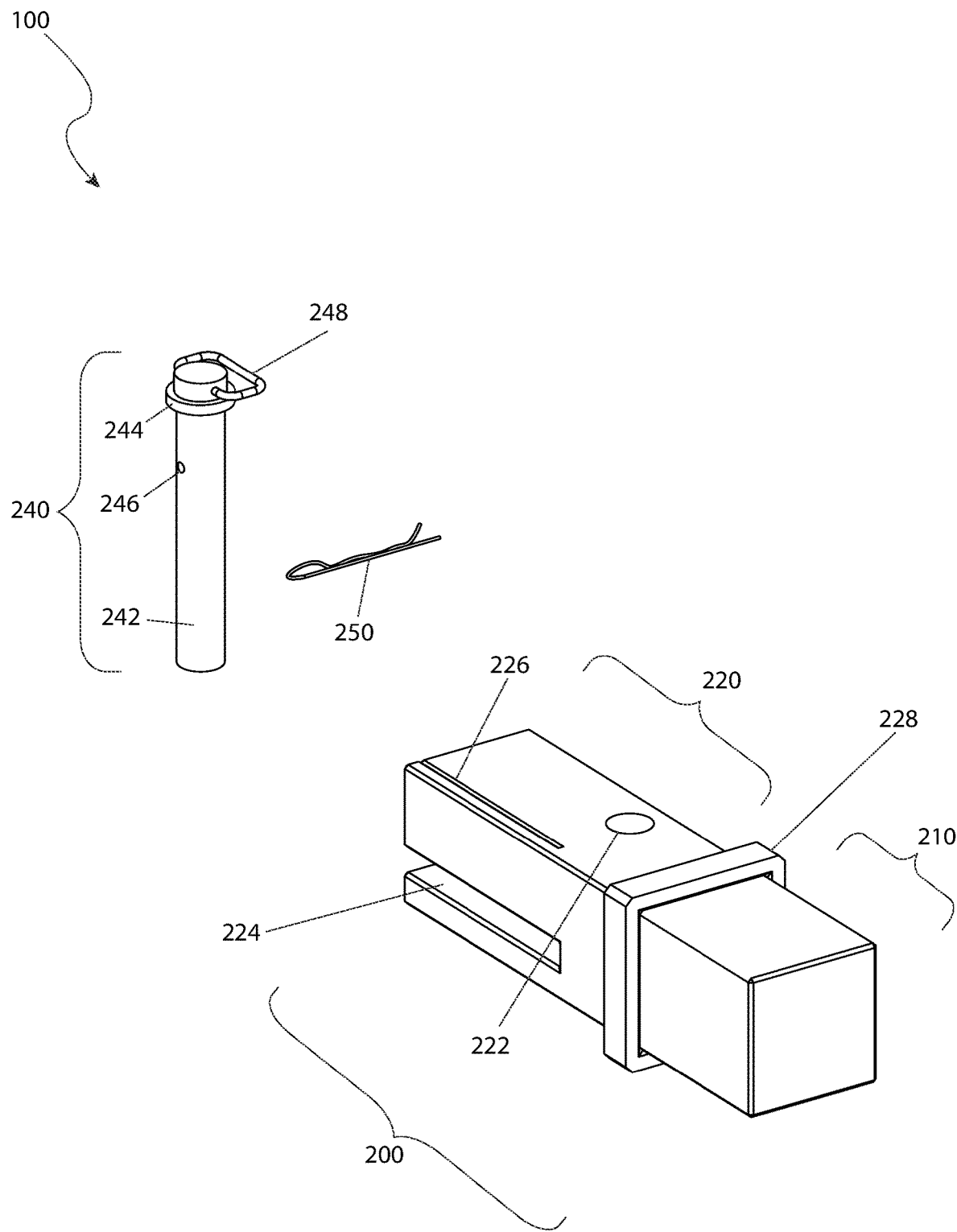
FIG. 1 is a front isometric view of a trailer anti-theft device 100, according to an embodiment of the present invention, illustrating an interposer 200.
Figure 2:
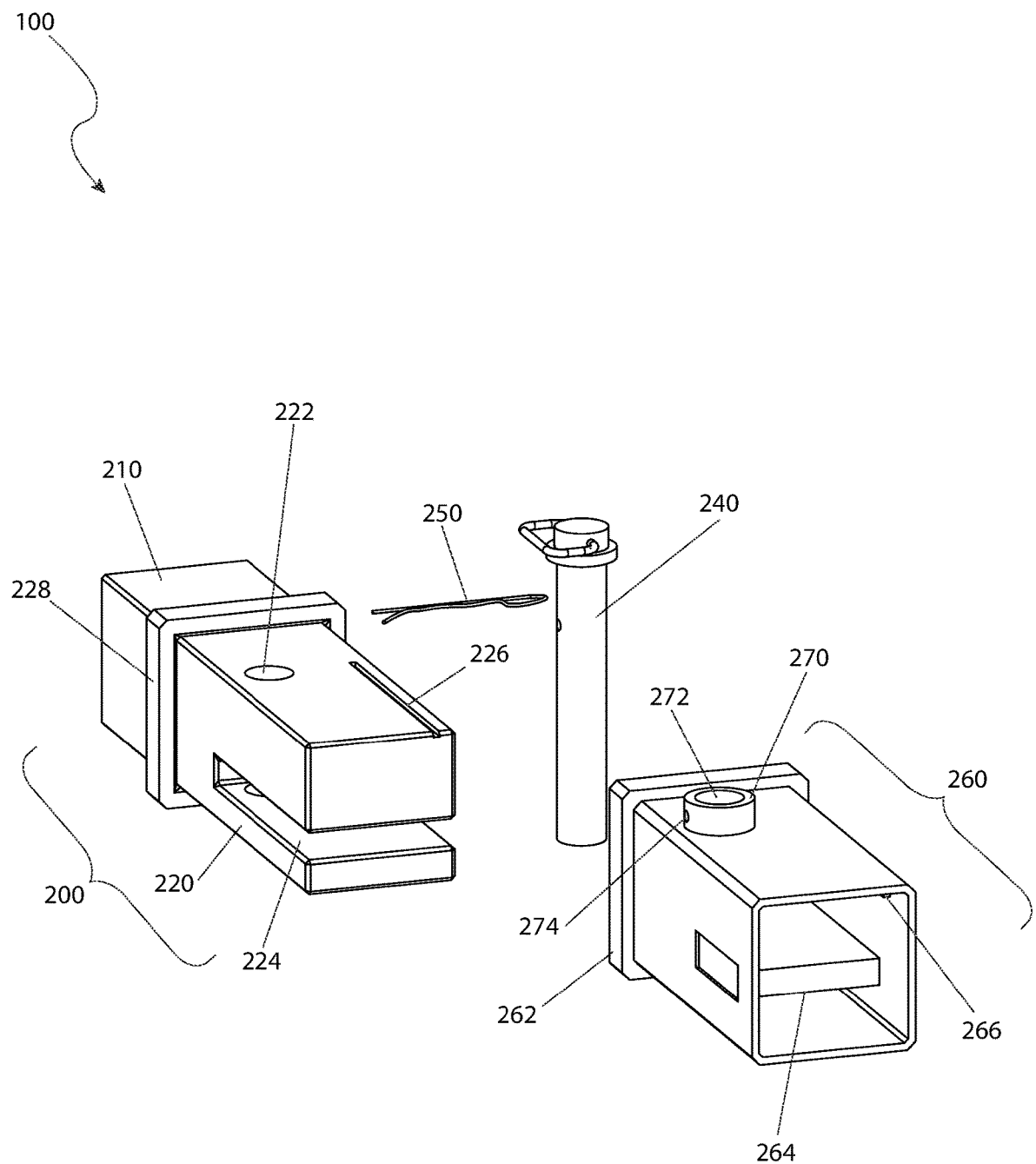
FIG. 2 is a rear isometric view of a trailer anti-theft device 100, according to an embodiment of the present invention, illustrating the tongue adapter 260, interposer 200, and hitch pin 240; and, FIG. 3 is an in-use view of a trailer anti-theft device 100, according to an embodiment of the present invention, illustrating the interposer 200 inserted into the tongue adapter 260; and, FIG. 4 is an exploded view of a trailer anti-theft device 100, according to an embodiment of the present invention, illustrating the coupler 910 coupled to the interposed 200.
Figure 3:
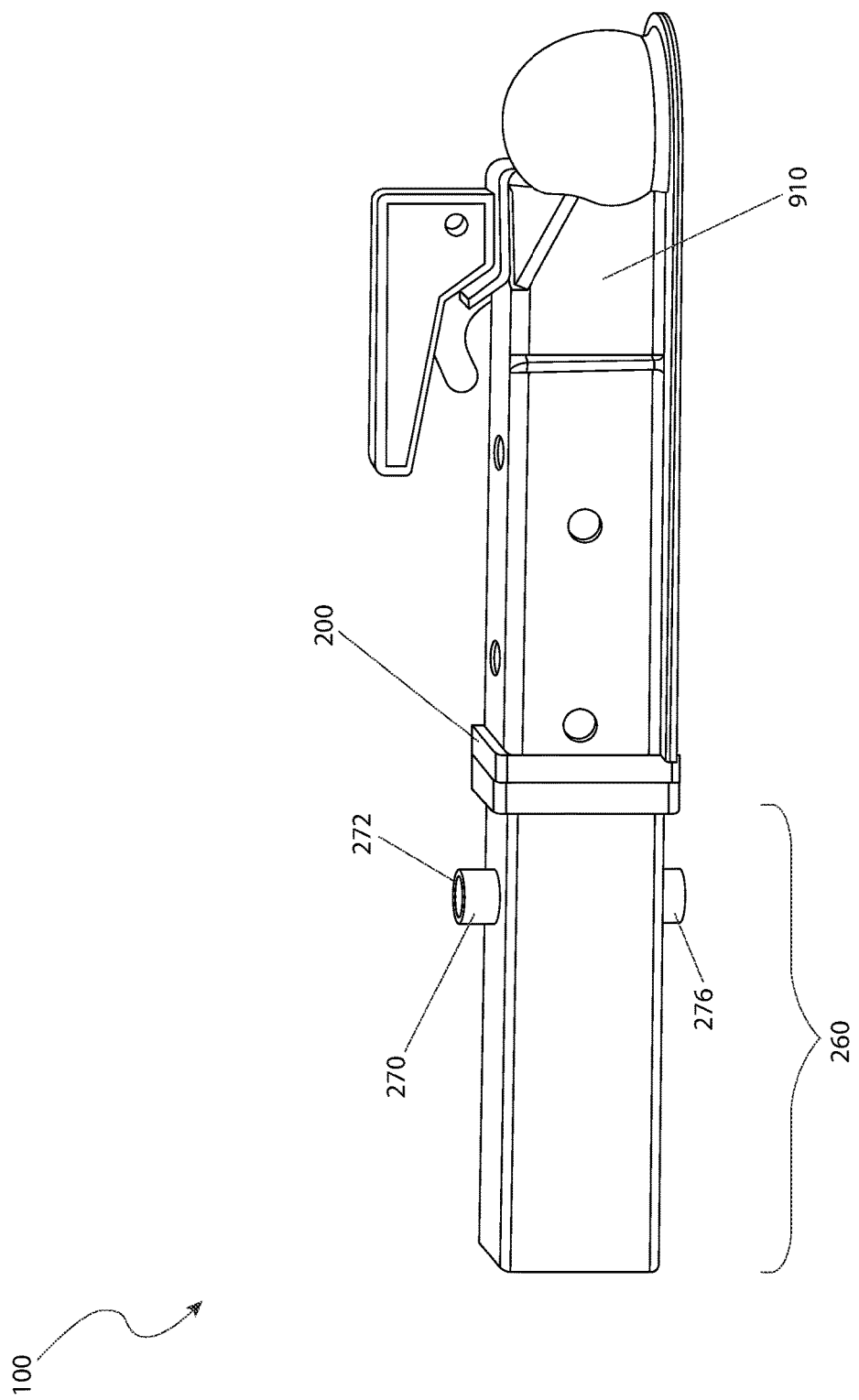
Figure 4:
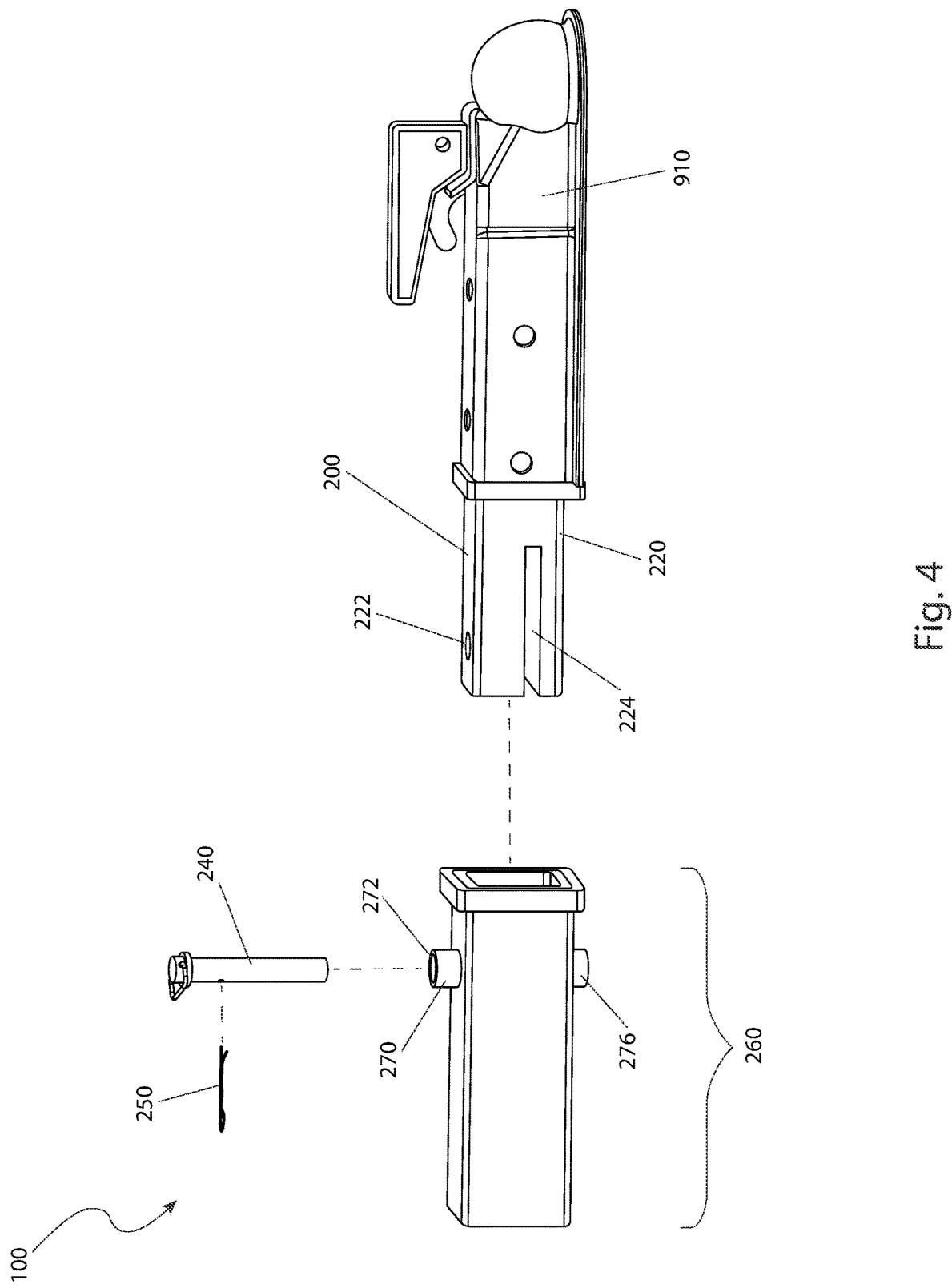

- 100 trailer anti-theft device
- 200 interposer
- 210 coupler interface
- 220 tongue interface
- 222 interposer aperture
- 224 blocker slot
- 226 keyway
- 228 interposer stop
- 240 hitch pin
- 242 hitch pin shaft
- 244 hitch pin collar
- 246 hitch pin clip aperture
- 248 hitch pin handle
- 250 retention clip
- 260 tongue adapter
- 262 adapter stop
- 264 blocker plate
- 266 key
- 270 upper collar
- 272 adapter aperture
- 274 collar clip aperture
- 276 lower collar
- 910 coupler

DESCRIPTION OF THE INVENTION

The present invention is directed to a trailer anti-theft device (herein described as the "invention") 100. The trailer anti-theft device 100 may comprise an interposer 200, a hitch pin 240, and a tongue adapter 260. A coupler 910 of a trailer may be coupled to the interposer 200. The tongue adapter 260 may be coupled to a tongue of the trailer. The interposer 200 may detachably couple to the tongue adapter 260 and may be retained by the hitch pin 240 in preparation for hitching the trailer to a tow vehicle for towing. The hitch pin 240 may be removed and the interposer 200 may be decoupled from the tongue adapter 260 when the trailer is stationary. The coupler 910 and the interposer 200 may be stored away from the trailer to deter theft of the trailer. In some embodiments, the interposer 200 and the tongue adapter 260 may comprise additional anti-theft features such that a substitute coupler will not fit in place of the coupler 910 that was removed.

The interposer 200 may be a solid square metal bar comprising a coupler interface 210, a tongue interface 220, and an interposer stop 228. The coupler interface 210 and the tongue interface 220 may be located at opposing ends of the interposer 200 with the interposer stop 228 defining the boundary between the coupler interface 210 and the tongue interface 220. The coupler interface 210 may define the front of the interposer 200 and the tongue interface 220 may define the rear of the interposer 200. The coupler interface 210 may be attached to the coupler 910 such that the coupler interface 210 is positioned on the coupler 910 where the tongue would ordinarily be positioned extending rearward from the coupler 910. As a non-limiting example, the coupler 910 may be welded to the coupler interface 210.

The tongue interface 220 may extend rearward to detachably couple to the tongue adapter 260. The tongue interface 220 may slide into the tongue adapter 260 and may be held in place by the hitch pin 240 passing through an interposer aperture 222 in the interposer 200 and through an adapter aperture 272 in the tongue adapter 260. The interposer 200 may be removed from the tongue adapter 260 by removing the hitch pin 240 and pulling the interposer 200 forward.

The interposer stop 228 may be an enlargement of the interposer 200 surrounding the interposer 200 at the boundary between the coupler interface 210 and the tongue interface 220. The interposer stop 228 may be operable to limit the insertion distance of the tongue interface 220.

The hitch pin 240 may prevent the interposer 200 from sliding out of the tongue adapter 260. The hitch pin 240 may comprise a hitch pin shaft 242 that may pass through the interposer aperture 222 and the adapter aperture 272. As non-limiting examples, the interposer aperture 222 may be the same diameter as the adapter aperture 272 and the diameter of the hitch pin shaft 242 may be smaller than both the diameter of the interposer aperture 222 and the diameter of the adapter aperture 272. A hitch pin collar 244 surrounding the top of the hitch pin shaft 242 may prevent the hitch pin 240 from passing entirely through the interposer 200 and the tongue adapter 260. The hitch pin shaft 242 may comprise a hitch pin clip aperture 246. A retention clip 250 may be detachably coupled to the hitch pin 240 via the hitch pin clip aperture 246 in order to secure the hitch pin 240 to the tongue adapter 260. As a non-limiting example, the retention clip 250 may be an R-clip. The hitch pin 240 may comprise a hitch pin handle 248 that may be adapted for a user to grasp in order to insert or remove the hitch pin 240.

The tongue adapter 260 may be a hollow square metal tube that may be coupled to the trailer to function as the tongue of the trailer. The outer diameter of the interposer 200 may be smaller than the inner diameter of the tongue adapter 260 such that the interposer 200 may slide into the tongue adapter 260. Specifically, the tongue interface 220 of the interposer 200 may slide into the tongue adapter 260 until the interposer stop 228 contacts the tongue adapter 260. In some embodiments, the tongue adapter 260 may comprise an adapter stop 262 which may be an enlargement of the tongue adapter 260 surrounding the front end of the tongue adapter 260. The adapter stop 262 may be operable to assure that the insertion distance of the interposer 200 is limited.

The tongue adapter 260 may comprise an upper collar 270. In some embodiments, the tongue adapter 260 may also comprise a lower collar 276. The upper collar 270 may be a boss located on the top of the tongue adapter 260 and the lower collar 276, if present, may be a boss located on the bottom of the tongue adapter 260. The upper collar 270 may align vertically with the lower collar 276 if both are present. The adapter aperture 272 may pass vertically through the center of the upper collar 270. The adapter aperture 272 and the upper collar 270 may be positioned such that the adapter aperture 272 aligns with the interposer aperture 222 when the interposer 200 is coupled to the tongue adapter 260. The upper collar 270 may comprise a collar clip aperture 274. The retention clip 250 may be inserted through the collar clip aperture 274 in the upper collar 270 and through the hitch pin clip aperture 246 in the hitch pin shaft 242 in order to secure the hitch pin 240.

The trailer anti-theft device 100 may comprise some or all of these anti-theft features that will prevent the substitute coupler from attaching to the tongue adapter 260. The interposer aperture 222 and the adapter aperture 272 may be off-center such that the hitch pin 240 may pass through the interposer 200 and the tongue adapter 260 however the substitute coupler may comprise a mis-aligned aperture relative to the tongue adapter 260. The interposer 200 may comprise a blocker slot 224 and the tongue adapter 260 may comprise a blocker plate 264. The blocker plate 264 may align with the blocker slot 224 such that the interposer 200 may slide into the tongue adapter 260 without interference. The substitute coupler may encounter the blocker plate 264, preventing attachment.

The interposer 200 may comprise at least one (1) keyway 226 and the tongue adapter 260 may comprise at least one (1) key 266. As a non-limiting example, a keyway 226 may be a longitudinal groove on the top of the tongue interface 220 and a key 266 may be a longitudinal ridge on the upper inside surface of the tongue adapter 260. The key 266 may align with the keyway 226 and the keyway 226 may be larger than the key 266 such that the key 266 may slide through the keyway 226 during attachment of the interposer 200 to the tongue adapter 260. The substitute coupler, lacking the keyway 226, may encounter interference that prevents attachment.

In use, the coupler 910 of the trailer may be removed from the tongue and coupled to the interposer 200. Alternatively, the coupler 910 of the trailer may be removed from the tongue and discarded and a different coupler may be coupled to the interposer 200. The tongue adapter 260 may be coupled to the trailer. As non-limiting examples, the tongue adapter 260 may be coupled to the trailer top extend the tongue or to replace the tongue.

To tow the trailer, the user may slide the interposer 200 into the tongue adapter 260 and secure the interposer 200 using the hitch pin 240. The coupler 910 may then be lowered onto a ball of a draw hitch on the tow vehicle, safety chains may be connected, and the tongue jack may be cranked to lower the coupler 910 onto the draw hitch.

When not being towed, safety chains may be disconnected, the coupler 910 may be lifted from the ball using the tongue jack. To prevent theft of the trailer, the hitch pin 240 may be removed and the interposer 200 may be pulled out of the tongue adapter 260 and stored separate from the trailer.

The exact specifications, materials used, and method of use of the trailer anti-theft device 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A trailer anti-theft device, comprising:
an interposer having a solid square metal bar having a coupler interface, a tongue interface, and an interposer stop, the interposer is adapted to couple to a trailer;
a tongue adapter adapted to couple to a tongue of the trailer;
a hitch pin having a hitch pin shaft that passes through an interposer aperture and an adapter aperture, the hitch pin prevents the interposer from sliding out of the tongue adapter;
wherein the interposer is detachably coupled to the tongue adapter and is retained by the hitch pin in preparation to adapt to hitching the trailer to a tow vehicle for towing;
wherein a coupler of the trailer is coupled to the interposer;
wherein the coupler and the interposer are stored away from the trailer to deter theft of the trailer;
wherein the interposer and the tongue adapter include a plurality of additional anti-theft features such that a substitute coupler will not fit in place of the coupler that was removed;
wherein the coupler interface is attached to the coupler such that the coupler interface is positioned on the coupler where the tongue would ordinarily be positioned extending rearward from the coupler;
wherein the coupler is welded to the coupler interface;
wherein the coupler interface and the tongue interface are located at opposing ends of the interposer with the interposer stop defining a boundary between the coupler interface and the tongue interface;
wherein the interposer stop is an enlargement of the interposer surrounding the interposer at a boundary between the coupler interface and the tongue interface to limit a insertion distance of the tongue interface;
wherein the interposer includes a blocker slot and the tongue adapter includes a blocker plate that aligns with the blocker slot such that the interposer slides into the tongue adapter without interference;
wherein the tongue adapter includes an upper collar and a lower collar;
wherein the upper collar is a boss located on a top of the tongue adapter, the lower collar, on a bottom of the tongue adapter;
wherein an upper collar aligns vertically with the lower collar if both are present;
wherein the upper collar includes a collar clip aperture and a retention clip is inserted through the collar clip aperture in the upper collar and through a hitch pin clip aperture in the hitch pin shaft in order to secure the hitch pin;
wherein the interposer aperture is an equal sized diameter as the adapter aperture and the diameter of the hitch pin shaft is smaller than both the diameter of the interposer aperture and the diameter of the adapter aperture;
wherein the hitch pin is removed and the interposer is decoupled from the tongue adapter when the trailer is stationary; and,
wherein the adapter aperture and the upper collar is positioned such that an adapter aperture aligns with the interposer aperture when the interposer is coupled to the tongue adapter.

2. The trailer anti-theft device, according to claim 1, wherein the coupler interface defines a front of the interposer and the tongue interface defines a rear of the interposer.

3. The trailer anti-theft device, according to claim 1, wherein the tongue interface extends rearward to detachably couple to the tongue adapter and slides into the tongue adapter and is held in place by the hitch pin passing through the interposer aperture disposed on the interposer and through an adapter aperture disposed on the tongue adapter.

4. The trailer anti-theft device, according to claim 1, wherein the tongue adapter includes an adapter stop which is an enlargement of the tongue adapter surrounding a front end of the tongue adapter to assure that an insertion distance of the interposer is limited.

5. The trailer anti-theft device, according to claim 1, further comprising a hitch pin collar surrounding a top of the hitch pin shaft to prevent the hitch pin from passing entirely through the interposer and the tongue adapter.

\* \* \* \* \*